US012681708B2

(12) United States Patent
Chibon et al.

(10) Patent No.: US 12,681,708 B2
(45) Date of Patent: Jul. 14, 2026

(54) EXECUTION OF REMOTE CONFIGURATION FILES AT CONTROL NODES

(71) Applicant: RED HAT, INC., Raleigh, NC (US)

(72) Inventors: Pierre-Yves Chibon, Saint-pol-de-léon (FR); Adam John Miller, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 19 days.

(21) Appl. No.: 18/484,602

(22) Filed: Oct. 11, 2023

(65) Prior Publication Data

US 2025/0123826 A1 Apr. 17, 2025

(51) Int. Cl.
*G06F 9/445* (2018.01)
*G06F 8/60* (2018.01)
*H04L 67/00* (2022.01)

(52) U.S. Cl.
CPC ............ *G06F 8/60* (2013.01); *G06F 9/44505* (2013.01); *H04L 67/34* (2013.01)

(58) Field of Classification Search
CPC ........................................................ G06F 8/60
USPC ........................................................ 717/174
See application file for complete search history.

(56) References Cited

U.S. PATENT DOCUMENTS 8,438,616 B2 * 5/2013 Chai .................... H04L 41/0846
726/4
9,588,749 B2 * 3/2017 Chen .......................... G06F 8/64

| | | | | |
|---|---|---|---|---|
| 9,921,851 | B2 * | 3/2018 | Artman ................. | G06F 9/4411 |
| 10,963,349 | B2 * | 3/2021 | Dhamdhere ........ | G06F 11/1438 |
| 11,038,784 | B2 | 6/2021 | Nickolov et al. | |
| 11,281,492 | B1 * | 3/2022 | Rebeja .................. | G06F 9/5077 |
| 2017/0033981 | A1 * | 2/2017 | Ruble ................. | H04L 41/0846 |
| 2017/0078140 | A1 * | 3/2017 | Gibson .............. | H04L 41/0886 |
| 2017/0177860 | A1 * | 6/2017 | Suarez .................... | G06F 21/53 |
| 2019/0042320 | A1 * | 2/2019 | Prince .................. | G06F 9/5077 |

(Continued)

FOREIGN PATENT DOCUMENTS

| | | | |
|---|---|---|---|
| CN | 113703782 A | | 11/2021 |
| CN | 114331312 A | * | 4/2022 |

OTHER PUBLICATIONS

Anonymous, "Ansible Get_Url," EDUCBA, Updated May 15, 2023: pp. 1-13.

(Continued)

*Primary Examiner* — Evral E Bodden
(74) *Attorney, Agent, or Firm* — Kilpatrick Townsend & Stockton LLP

(57) ABSTRACT

Control nodes can execute configuration files from remote locations according to some examples described herein. For example, a control node may receive an input indicating a remote location, which can include configuration files. In response to receiving the input, the control node may retrieve a configuration file from the remote location. The configuration file can be used by the control node to deploy a software entity at one or more nodes. The control node may analyze the configuration file to detect one or more references indicating one or more resources associated with the configuration file. The control node can then generate an executable version of the configuration file by retrieving each of the resources. The control node can further execute the executable version of the configuration file to deploy the software entity at each of the nodes.

17 Claims, 3 Drawing Sheets

300

302
Receive an input indicating a remote location comprising a plurality of configuration files 304
Retrieve a configuration file of the plurality of configuration files from the remote location, wherein the configuration file is usable by the control node to deploy a software entity to each node of a plurality of nodes 306
Analyze the configuration file to detect a plurality of references indicating a plurality of resources associated with the configuration file 308
Generate an executable version of the configuration file by retrieving each resource of the plurality of resources 310
Execute the executable version of the configuration file to deploy the software entity at each node of the plurality of nodes

(56)                     References Cited

U.S. PATENT DOCUMENTS

2019/0324786 A1 * 10/2019 Ranjan ................ G06F 9/45558
2021/0004292 A1 *  1/2021 Zlotnick .............. G06F 9/4416
2023/0121268 A1 *  4/2023 Mueller ............... H04L 41/147
                                                       370/229

OTHER PUBLICATIONS

Ellingswood et al., "How to Use Ansible Roles to Abstract your Infrastructure Environment," DigitalOcean, Feb. 11, 2014: pp. 1-21.
Hiatt, "Ansible copy and other Ways to Copy Files to Remote Hosts," Adam the Automator, Apr. 1, 2021: p. 1-14.
Sarav, "Ansible Git Example—Checkout code from Git Repo Securely," Middleware Inventory, Jan. 19, 2022: pp. 1-17.

* cited by examiner

300

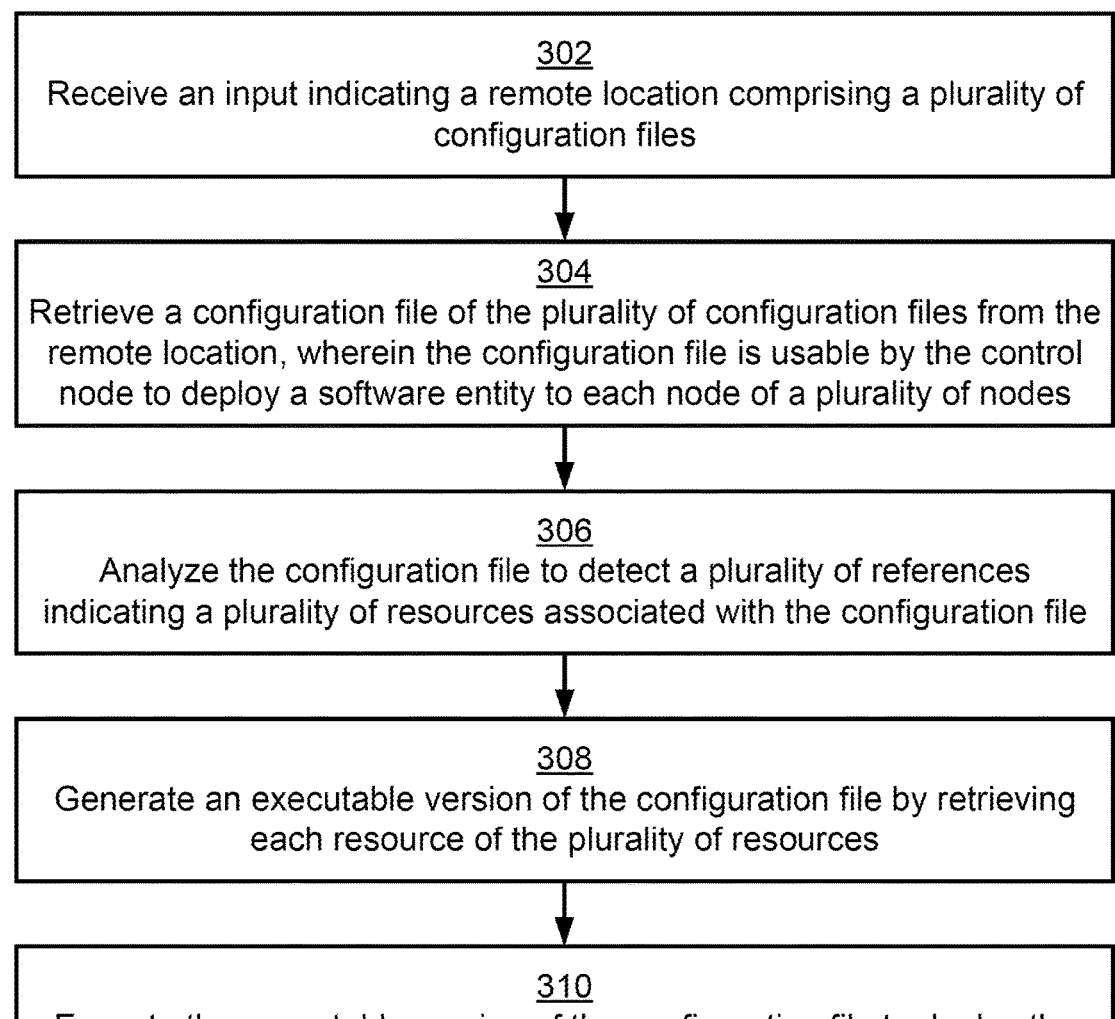

302
Receive an input indicating a remote location comprising a plurality of configuration files 304
Retrieve a configuration file of the plurality of configuration files from the remote location, wherein the configuration file is usable by the control node to deploy a software entity to each node of a plurality of nodes 306
Analyze the configuration file to detect a plurality of references indicating a plurality of resources associated with the configuration file 308
Generate an executable version of the configuration file by retrieving each resource of the plurality of resources 310
Execute the executable version of the configuration file to deploy the software entity at each node of the plurality of nodes

FIG. 3

EXECUTION OF REMOTE CONFIGURATION FILES AT CONTROL NODES

TECHNICAL FIELD

The present disclosure relates generally to control nodes usable in computing environments and, more particularly (although not necessarily exclusively), to executing remote configuration files at control nodes.

BACKGROUND

Distributed computing environments such as cloud computing environments and computing clusters have recently grown in popularity. These computing environments can include large numbers of nodes (e.g., physical or virtual machines) for use in performing various computing tasks. Given the complexity of some distributed computing environments, automation frameworks have been developed that help manage them more efficiently. These automation frameworks can help to automate the deployment, configuration, and management of various aspects of a distributed computing environment.

One popular automation framework is Ansible by Red Hat®. Ansible is a software tool that can assist with deploying applications, updating workstations and servers, cloud provisioning, configuration management, and many other functions for systems administrators. In Ansible, there are two categories of computers: control nodes and managed nodes. A control node generally runs Ansible and manages the managed nodes. A managed node can be any computing device that is managed by the control node. The control node can transmit small software programs called "modules" to the managed nodes, which can run the modules. When executed, the modules can configure the managed nodes to conform to a target state. Once they finish executing, the modules can be removed from the managed nodes. In this way, the modules can be temporarily stored on the managed nodes for the duration of time in which they execute and then removed.

In Ansible, the modules provide a means to accomplish a desired automation task, but the way in which the modules are used is governed by a "playbook." A playbook is a configuration file drafted in a human-readable language that provides instructions for what needs to be done to transform a managed node into a target state. Playbooks are typically written in a YAML Ain't Markup Language (YAML) format, though other formats are possible.

BRIEF DESCRIPTION OF THE DRAWINGS

FIG. 3 is a flowchart of a process for executing remote playbooks at control nodes according to some examples of the present disclosure.

DETAILED DESCRIPTION

Figure 1:
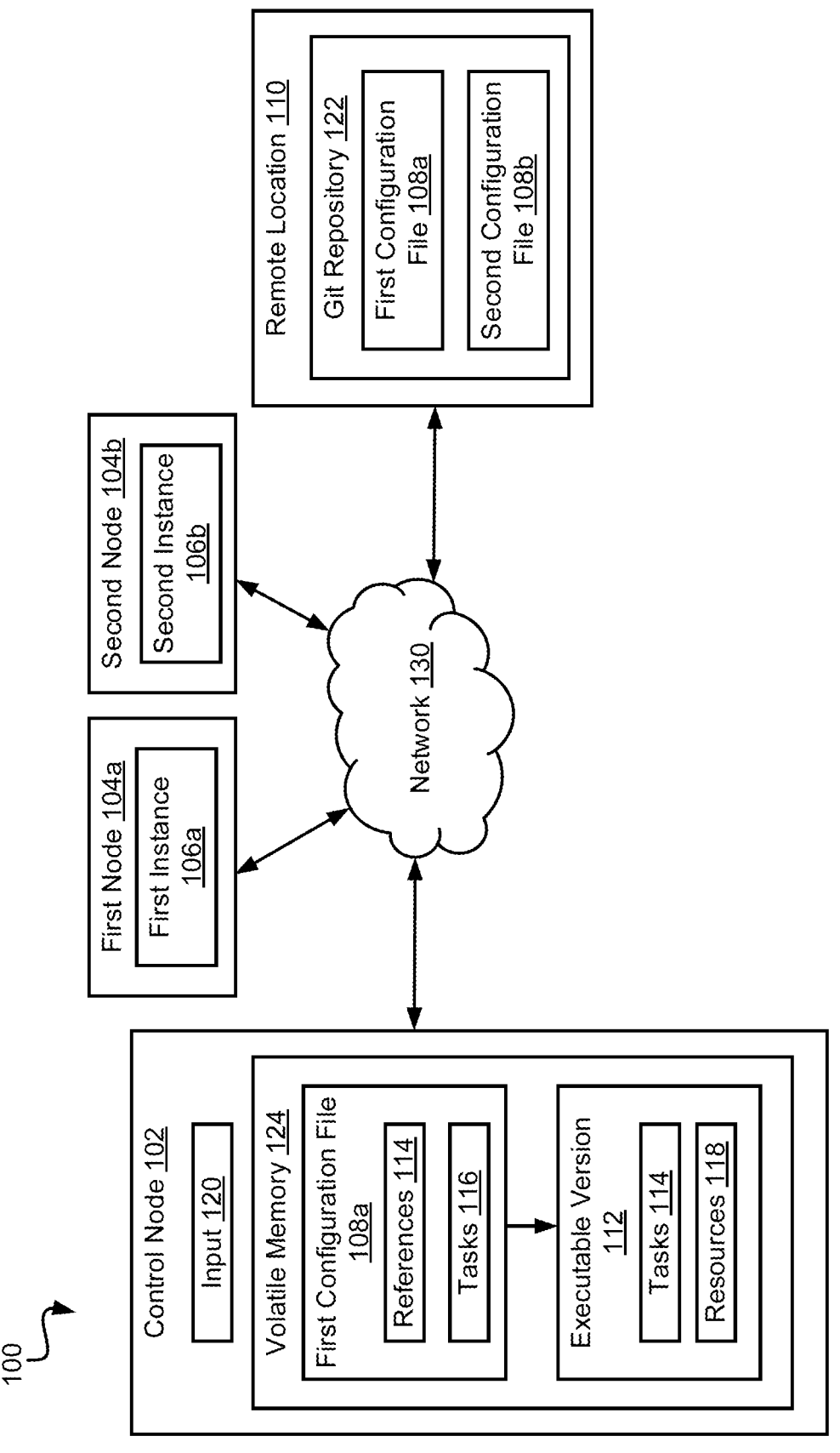
FIG. 1 is a block diagram of an example a distributed computing environment for executing remote playbooks at control nodes according to some examples of the present disclosure.

Some automation frameworks (e.g., Ansible) involve a control node and one or more managed nodes. The control node can manage the managed nodes by configuring them so that they conform to a target state. This configuration process may involve the control node transmitting, based on a configuration file, commands or modules to the managed nodes for installing operating systems, applications, and other software on the managed nodes and configuring the settings thereof. Current automation frameworks may require a system administrator to manually provide configuration files, such as Ansible playbooks, for use by the control node in managing the managed nodes. Thus, local copies of the configuration files can be required for the control node to manage the managed nodes. The local copies may be downloaded and stored on a local disk of the control node. In some examples, the local copies can be in a Git repository, a local copy of which can also be stored at the control node. The requirement of local copies and corresponding manual process of providing the configuration files to control nodes can be time consuming and tedious. For example, each time a configuration file is updated, it can be necessary to load and store the updated configuration file locally at the control node and import the updated configuration file into the automation framework. Additionally, if the updated configuration file is not downloaded locally at the control node and imported into the automation framework, the automation framework will continue to use an outdated version of the configuration file.

Some examples of the present disclosure can overcome one or more of the abovementioned problems by automatically executing remote configuration files at control nodes. For example, a control node can receive an input indicating a remote location. The remote location can be any location that is separate from the control node. The control node can access the remote location to retrieve a configuration file, can analyze the configuration file to detect files or other suitable resources associated with the configuration file, and can retrieve the files or other suitable resources to generate an executable version of the configuration file. In doing so, the executable version of the configuration file (e.g., an Ansible playbook) can be automatically loaded in memory at the control node rather than manually downloaded by a system administrator. The control node may then automatically execute the executable version of the configuration file to configure one or more nodes for deploying a software entity. By automatically downloading and executing the configuration file in response to the input, the control node can deploy the software entity efficiently. Additionally, the configuration files can be stored and updated in the remote location. Thus, the configuration file downloaded and executed in response to the input can always be a most updated version of the configuration file. Automatically downloading the most updated version of the configuration file in response to the input can be more time and resource efficient than manually downloading and importing each update to the configuration file. Moreover, the storage of the configuration file in memory may be temporary, thereby requiring less computational resources than local storage of the configuration file.

In one particular example, a user may want to deploy a software entity, such as a container, at one or more nodes using an automation framework (e.g., Ansible). To do so, the user can provide, via a command line interface associated with the automation framework, a Hypertext Transfer Protocol (HTTP) Uniform Resource Locator (URL) to a control node. The HTTP URL can specify a remote location on the internet that includes configuration files. The control node may access the remote location using the HTTP URL and may load, to memory, a configuration file associated with deploying the container from remote location. The configuration file can include tasks for deploying the container but may not include resources for executing the tasks. Thus, the control node may determine the resources by analyzing the configuration file to detect references indicative of the resources. The resources can include modules, template files, and the like. After determining the resources, the control node can retrieve the resources to construct a full, in memory copy of an Ansible Playbook for deploying the container. In other words, the control node can retrieve the resources to generate an executable version of the configuration file. The control node may retrieve the resources from the remote location. The control node may then execute the executable version of the configuration file by deploying the modules at the nodes or performing other suitable actions based on the tasks included configuration file. In doing so, the control can deploy the container at each of the nodes.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example a distributed computing environment 100 for executing remote configuration files at control nodes according to some examples of the present disclosure. In some examples, the distributed computing environment 100 may be an edge computing environment, a cloud computing environment, or a computing cluster, formed from one or more nodes (e.g., physical or virtual servers) that are in communication with one another via a network 130, such as a local area network (LAN), wide area network (WAN), the Internet, or any combination thereof.

The distributed computing environment 100 can include a control node 102 that can manage the first node 104a and the second node 104b. The control node 102 can establish a network connection, such as via the network 130, with each of the first node 104a and the second node 104b through which the control node 102 can manage the nodes 104a-b. Examples of the control node 102 or of the nodes 104a-b can include desktop computers, laptop computers, servers, mobile phones, tablets, etc.

The control node 102 can control deployment of instances 106a-b of a software entity on the nodes 104a-b using a configuration management system such as Ansible by Red Hat®. For example, the control node 102 can use a first configuration file 108a (e.g., an Ansible playbook) to automate deployment of the software entity. The first configuration file 108a can include a list of tasks 116 that the control node 102 can execute to deploy the software entity to the nodes 104a-b or to containers or virtual machines executing on the nodes 104a-b. The first configuration file 108a can also be executed to deploy updates and configure networking, security, user management, and cloud management for the distributed computing environment 100.

In some examples, the first configuration file 108a can be stored in a remote location 110. Thus, the control node 102 may receive an input 120 indicative of the remote location 110. The input 120 may be provided by a user of the control node 102. For example, a user may provide the input 120 via a command line interface associated with the configuration management system used by the control node 102. Alternatively, the input 120 may be transmitted to the control node 102 from another node, such as from a client device. The input 120 may specify a name, uniform resource locator (URL), internet protocol (IP) address, or other suitable identifier of the remote location 110. The remote location 110 can be, or include, any computing device that is separate from the control node 102. In some examples, the remote location 110 may correspond to a distributed computing environment, such as a cloud computing environment. Additionally, in some examples, the remote location 110 may correspond to a web page, file, service, or the like. Additionally, the remote location 110 can include any number of configuration files. For example, the remote location 110 can include the first configuration file 108a and a second configuration file 108b. The remote location 110 can also be, or include, a Git repository 122 in which the configuration files 108a-b can be stored.

Based on receiving the input 120, the control node 102 can initiate a process to retrieve and build an executable version 112 of the first configuration file 108a. For example, after receiving the input 120 the control node can locate and access the remote location 110 to retrieve the first configuration file 108a. To access the remote location 110 the control node can establish a network connection, such as via the network 130, with the remote location 110. Additionally, in some examples, the input 120 can include an indication or instruction to cause the control node 102 to retrieve the first configuration file 108a. The control node 102 may retrieve the first configuration file 108a by loading the first configuration file 108a in volatile memory 124 (e.g., Random-Access Memory (RAM)).

Once loaded into memory, the control node 102 can analyze the first configuration file 108a to detect references 114 to resources 118 present in the first configuration file 108a. The references 114 can provide names or other suitable identifiers of the resources 118. The resources 118 can include modules, which can be self-contained units of code used to perform the tasks 116. For example, the modules can be used to install packages, copy files, manage services, configure system settings, etc. at the nodes 104a-b. Thus, the references 114 can be names of modules required to perform the tasks 116. Additionally, the references 114 can be to template files, external reference files, or other suitable resources associated with the tasks 116 and therefore associated with deploying the instances 106a-b of the software entity.

The control node 102 can then build the executable version 112 of the first configuration file 108a by acquiring the resources 118 as indicated by the references 114. In some examples, the resources 118 may be stored in the remote location 110 or in another remote location accessible by the control node 102. Thus, in an example, the control node 102 may query or other request each of the resources 118 from the remote location 110. In this way, the control node 102 can generate the executable version 112 of the first configuration file 108a (e.g., a full copy of an Ansible playbook) with all of the resources (e.g., modules, files, etc.) for performing the tasks 116. The executable version 112 can also be generated and stored in the volatile memory 124.

The control node 102 can then execute the executable version 112 of the first configuration file 108a to deploy the instances 106a-b of the software entity, such as a container, virtual machine, application, or any other type of software service to both of the nodes 104a-b. For example, copies of the executable version 112 of the first configuration file 108a can be pushed down to the nodes 104a-b. The first configuration file 108a can dictate that the instances 106a-b of the software entity be built according to the tasks 116 laid out within the first configuration file 108a. Additionally, the resources 118, such as the modules, can be deployed as part of pushing the copies of the executable version 112 to the nodes 104a-b and in accordance with the tasks 116. In an example, the software entity may be a container, the first configuration file 108a may be a container specification file, and the remote location 110 may be a container registry. Thus, by executing the executable version 112 of the first configuration file 108a, instances of the same container build from the container specification file may be built on each of the first node 104a and the second node 104b.

While FIG. 1 depicts a specific arrangement of components, other examples can include more components, fewer components, different components, or a different arrangement of the components shown in FIG. 1. For instance, in other examples, a different number of instances of software entities may be installed on a different number of nodes. Additionally, any component or combination of components depicted in FIG. 1 can be used to implement the process(es) described herein.

Figure 2:
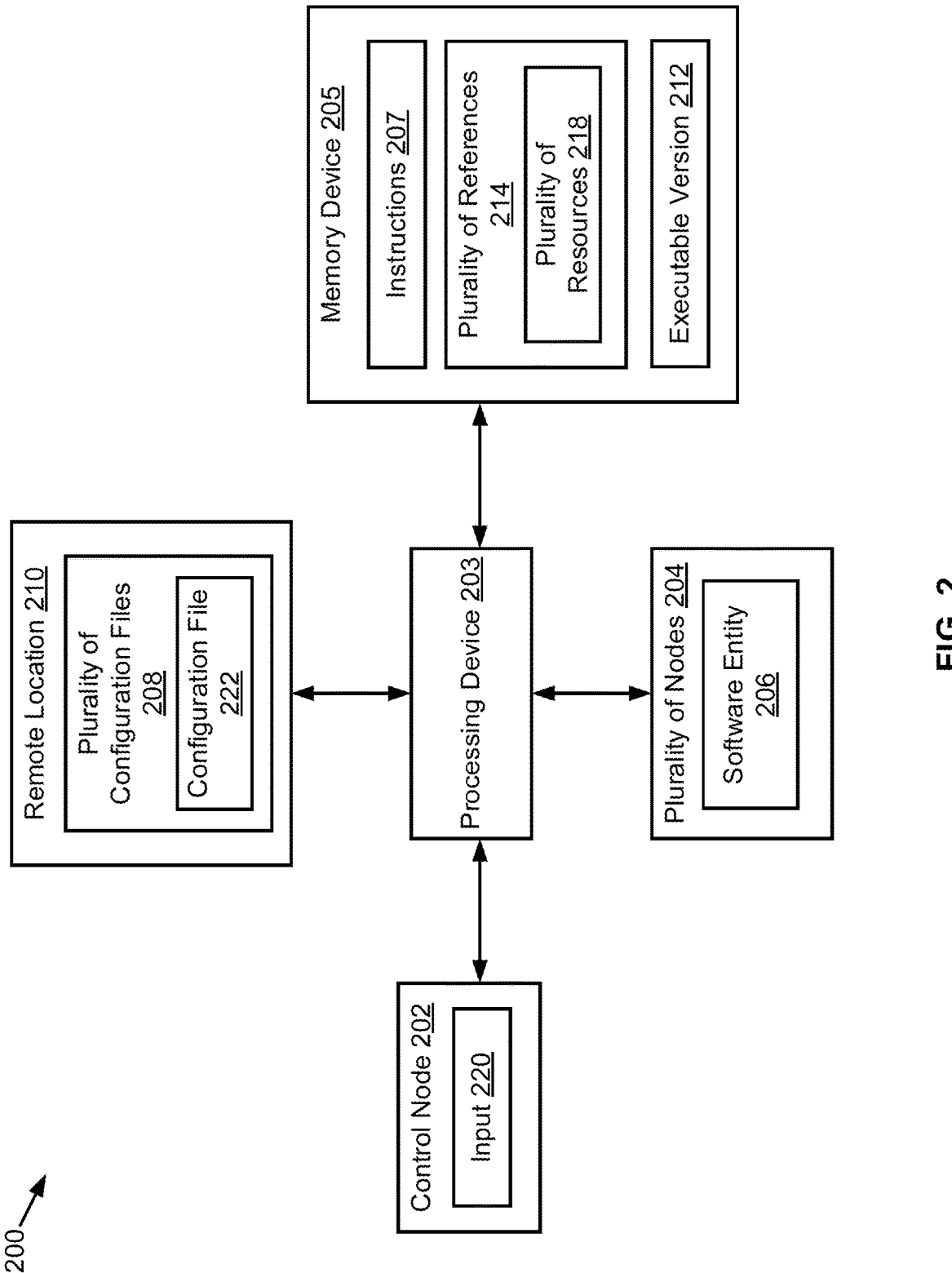
FIG. 2 is a block diagram of an example of a computing environment for executing remote playbooks at control nodes according to some examples of the present disclosure.

FIG. 2 is a block diagram of an example of a computing environment 200 for executing remote configurations files at control nodes according to some examples of the present disclosure. The computing environment 200 includes a processing device 203 communicatively coupled to a memory device 205. In some examples, the components of the computing environment 200, such as the processing device 203 and the memory device 205, may be part of a same computing device, such as the control node 202. The control node 202 can correspond to the control node 102 depicted in FIG. 1. In other examples, the processing device 203 and the memory device 205 can be included in separate computing devices that are communicatively coupled.

The processing device 203 can include one processing device or multiple processing devices. Non-limiting examples of the processing device 203 can include a Field-Programmable Gate Array (FPGA), an application-specific integrated circuit (ASIC), and a microprocessor. The processing device 203 can execute instructions 207 stored in the memory device 205 to perform computing operations. In some examples, the instructions 207 can include processor-specific instructions generated by a compiler or an interpreter from code written in any suitable computer-programming language, such as C, C++, C#, etc.

The memory device 205 can include one memory or multiple memories. The memory device 205 can be non-volatile and may include any type of memory that retains stored information when powered off. Non-limiting examples of the memory device 205 include electrically erasable and programmable read-only memory (EEPROM), flash memory, or any other type of non-volatile memory. At least some of the memory device 205 can include a non-transitory computer-readable medium from which the processing device 203 can read instructions 207. A computer-readable medium can include electronic, optical, magnetic, or other storage devices capable of providing the processing device 203 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 207.

In some examples, the processing device 203 can execute the instructions 207 to perform some or all of the functionality described herein. For example, the processing device 203 can receive, by the control node 202, an input 220 indicating a remote location 210. The remote location 210 can include a plurality of configuration files 208. Each of the plurality of configuration files 208 can be used by the control node 202 to deploy a software entity 206 to each node of a plurality of nodes 204. Additionally, in response to receiving the input 220, the processing device 203 can retrieve, by the control node 202, a configuration file 222 of the plurality of configuration files 208 from the remote location 210. The processing device 203 can further analyze, by the control node 202, the configuration file 222 to detect a plurality of references 214 indicating a plurality of resources 218 associated with the configuration file 222. The processing device 203 can also generate, by the control node 202, an executable version 212 of the configuration file 222 by retrieving each resource of the plurality of resources 216. The processing device 203 may then execute, by the control node 202, the executable version 212 of the configuration file 222 to deploy the software entity 206 at each node of the plurality of nodes 204.

FIG. 3 is a flowchart of a process 300 for executing remote configuration files at control nodes according to some examples of the present disclosure. In some examples, the processing device 203 can implement some or all of the steps shown in FIG. 3. Additionally, in some examples, the processing device 203 can be executing on or in communication with the control node 102 of FIG. 1 to implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302 the processing device 203 can receive an input 220 indicating a remote location 210 comprising a plurality of configuration files 208. In an example, the input 220 can be a Uniform Resource Locator (URL), which can be used to access a Git repository 122. The Git repository 122 may include the plurality of configuration files 208, such as at least a first configuration file 108a and a second configuration file 108b.

At block 304, the processing device 203 can retrieve a configuration file 222 of the plurality of configuration files 208 from the remote location 210. The configuration file 222 can be used to deploy a software entity 206 to each node of a plurality of nodes 204. The software entity 206 may be an application, container, virtual machine, or any other suitable software service. In the example, the configuration file 222 can correspond to the second configuration file 108b depicted in FIG. 1. Therefore, the processing device 203 can retrieve the second configuration file 108b from the Git repository 122. The second configuration file 108b can be an application deployment playbook, which can be used for deploying a software application at each of the nodes 204.

At block 306, the processing device 203 can analyze the configuration file to extract a plurality of references 214 indicating a plurality of resources 218 associated with the configuration file 222. The resources 218 can include modules, files, or other suitable resources. In the example, the second configuration file 108b can include a set of tasks which define steps to be executed on the nodes 204 to deploy the software entity 206. The resources 218, such as the modules or other files, may be used in performing each task of the set of tasks.

At block 308, the processing device 203 can generate an executable version 212 of the configuration file 222 by retrieving each resource of the plurality of resources 218. In the example, the processing device 203 may retrieve each of the resources 218 from the remote location 210 based on the references 214. For example, the processing device 203 can query the remote location 210 for each resource and the remote location 210 can, in response, transmit the resources 218 to the control node 202 associated with the processing device 203. The executable version 212 created by processing device 203 retrieving the second configuration file 108*b* and the resources 218 can be an up-to-date version of the second configuration file 108*b*.

At block 310, the processing device 203 can execute the executable version 212 of the configuration file 222 to deploy the software entity 206 at each node of the plurality of nodes 204. In the example, the software application can be deployed at the nodes 204 as a result of the processing device 203 executing the executable version 212 of the second configuration file 108*b*.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
receiving, at a control node, an input indicating a remote location comprising an orchestration playbook that defines a plurality of tasks for deploying a containerized software application and comprising a plurality of modules usable to perform the plurality of tasks;
in response to receiving the input:
retrieving, by the control node, the orchestration playbook from the remote location, wherein the orchestration playbook is usable by the control node to deploy a container comprising the containerized software application to each node of a plurality of nodes, and wherein the orchestration playbook comprises a plurality of references indicating the plurality of modules;
generating, by the control node and based on the plurality of references, an executable version of the orchestration playbook by retrieving each module of the plurality of modules from the remote location; and
executing, by the control node, the executable version of the orchestration playbook to deploy the containerized software application in the container at each node of the plurality of nodes by performing the plurality of tasks using the plurality of modules.

2. The system of claim 1, wherein the memory device further includes instructions executable by the processing device for causing the processing device to perform operations comprising:
subsequent to retrieving the orchestration playbook from the remote location, storing the orchestration playbook in volatile memory of the control node.

3. The system of claim 1, wherein the operation of retrieving each module of the plurality of modules comprises:
requesting each module of the plurality of modules from the remote location; and
receiving each module of the plurality of modules from the remote location.

4. The system of claim 1, wherein the memory device further includes instructions executable by the processing device for causing the processing device to perform operations comprising:
establishing a first network connection between the control node and the remote location; and
establishing a second network connection between the control node and each node of the plurality of nodes.

5. The system of claim 1, wherein the remote location comprises a Git Repository.

6. The system of claim 1, wherein the input comprises a Hypertext Transfer Protocol (HTTP) Uniform Resource Locator (URL).

7. A method comprising:
receiving, at a control node, an input indicating a remote location comprising an orchestration playbook that defines a plurality of tasks for deploying a containerized software application and comprising a plurality of modules usable to perform the plurality of tasks;
in response to receiving the input:
retrieving, by the control node, the orchestration playbook from the remote location, wherein the orchestration playbook is usable by the control node to deploy a container comprising the containerized software application to each node of a plurality of nodes, and wherein the orchestration playbook comprises a plurality of references indicating the plurality of modules;
generating, by the control node and based on the plurality of references, an executable version of the orchestration playbook by retrieving each module of the plurality of modules; and
executing, by the control node, the executable version of the orchestration playbook to deploy the containerized software application in the container at each node of the plurality of nodes by performing the plurality of tasks using the plurality of modules.

8. The method of claim 7, further comprising, subsequent to retrieving the orchestration playbook from the remote location, storing the orchestration playbook in volatile memory of the control node.

9. The method of claim 7, wherein retrieving each module of the plurality of modules comprises:
requesting each module of the plurality of modules from the remote location; and
receiving each module of the plurality of modules from the remote location.

10. The method of claim 7, further comprising:
establishing a first network connection between the control node and the remote location; and
establishing a second network connection between the control node and each node of the plurality of nodes.

11. The method of claim 7, wherein the remote location comprises a Git Repository.

12. The method of claim 7, wherein the input comprises a Hypertext Transfer Protocol (HTTP) Uniform Resource Locator (URL).

13. A non-transitory computer-readable medium comprising instructions that are executable by a processing device for causing the processing device to perform operations comprising:
receiving, at a control node, an input indicating a remote location comprising an orchestration playbook that defines a plurality of tasks for deploying a containerized software application and comprising a plurality of modules usable to perform the plurality of tasks;
in response to receiving the input:

retrieving, by the control node, the orchestration play-book from the remote location, wherein the orchestration playbook is usable by the control node to deploy a container comprising the containerized software application to each node of a plurality of nodes, and wherein the orchestration playbook comprises a plurality of references indicating the plurality of modules;

generating, by the control node and based on the plurality of references, an executable version of the orchestration playbook by retrieving each module of the plurality of modules; and executing, by the control node, the executable version of the orchestration playbook to deploy the containerized software application in the container at each node of the plurality of nodes by performing the plurality of tasks using the plurality of modules.

14. The non-transitory computer-readable medium of claim 13, further comprising instructions executable by the processing device for causing the processing device to perform operations comprising:

subsequent to retrieving the orchestration playbook from the remote location, storing the orchestration playbook in volatile memory of the control node.

15. The non-transitory computer-readable medium of claim 13, wherein the operation of retrieving each module of the plurality of modules comprises:

requesting each module of the plurality of modules from the remote location; and receiving each module of the plurality of modules from the remote location.

16. The non-transitory computer-readable medium of claim 13, further comprising instructions executable by the processing device for causing the processing device to perform operations comprising:

establishing a first network connection between the control node and the remote location; and establishing a second network connection between the control node and each node of the plurality of nodes.

17. The non-transitory computer-readable medium of claim 13, wherein the remote location comprises a Git Repository.

* * * * *